Oct. 20, 1970 N. B. COLEY ET AL 3,535,681
CODE COMMUNICATION SYSTEM
Filed Feb. 21, 1968
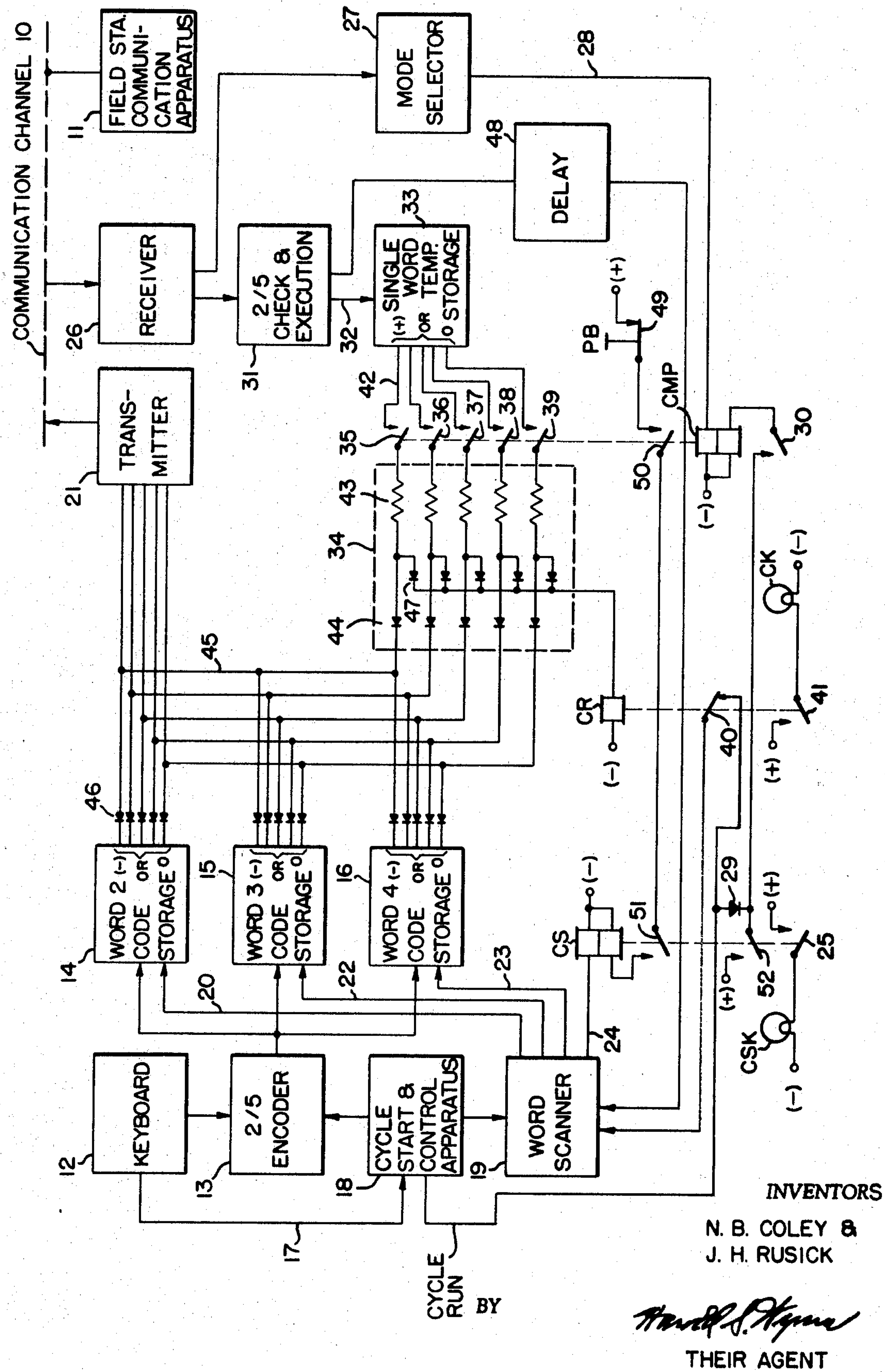
INVENTORS
N. B. COLEY &
J. H. RUSICK
BY
[signature]
THEIR AGENT United States Patent Office 3,535,681
Patented Oct. 20, 1970

3,535,681

CODE COMMUNICATION SYSTEM

Nelson B. Coley, Honeoye Falls, and Jack H. Rusick, Rochester, N.Y., assignors to General Signal Corporation, Rochester, N.Y., a corporation of New York Filed Feb. 21, 1968, Ser. No. 707,195
Int. Cl. G08c 25/02
U.S. Cl. 340—146.1 2 Claims

ABSTRACT OF THE DISCLOSURE

A system for checking an answerback code by an inhibit circuit after the code has first been checked as being a valid two out of five code. A word scanner scans word code storages during an answerback cycle and proceeds to a final stage to manifest correspondence between transmitted and answerback word storages. This manifestation is provided only if the mark bit outputs of a particular polarity of an answerback storage have all been inhibited by the opposite polarity applied to corresponding mark bit output wires of the other storage for each word of an answerback code.

This invention relates to two-way code communication systems, and it more particularly pertains to systems for checking the integrity of code communication over a communication channel connecting a plurality of stations.

Codes of the general character of a two out of five code are often used for code communication so that the integrity of the code can be readily checked with a minimum amount of apparatus. Such a code is checked as having two and only two characters of a particular type, such as marks in a mark-space code. Such a check detects all single errors in the code, but does not detect some double errors.

The system according to the present invention adds to the two out of five check system a further check using inhibit circuits for determining bit for bit that each mark character received in an answerback code corresponds to a mark character originally transmitted for that bit. The two out of five code check is also used because this inhibit system does not check the absence of a mark in the answerback code which would be detected by the two out of five checking system.

An object of the present invention is to check an answerback code, partly as a two out of five check, and partly to check that elements of a particular character for the respective bits of the answerback code are the same as elements transmitted for the same code bits of respective words during a cycle of operation.

Other objects, purposes and characteristic features of the present invention will be in part obvious from the accompanying drawing and in part pointed out as the description progresses.

With reference to the drawing, one embodiment of the present invention comprises a system of two-way communication over a communication channel 10 connecting a plurality of stations. One of the stations can be a control office, and another station can be a field station. The field station is illustrated as having code communication apparatus 11 for transmitting and receiving over the communication channel 10. Although the communication system can be used for different purposes, thus having different modes of operation, the system according to the embodiment disclosed will be assumed to comprise one mode involving designation of a particular set point or function wherein a multiple word code is transmitted from the control office to the field station for selection of the function, and the field station apparatus 11 transmits an answerback code to the office to verify the code that has been received.

After transmission of a first word code from the control office to define the mode of the communication cycle, second, third and fourth words can be used to represent a multiple digit number designated by actuation of keys of a keyboard 12. The first digit of the number designated is encoded by a two out of five encoder 13 and applied to word 2 code storage 14. Similarly the codes for the second and third digits of the number designated are applied to word storages 15 and 16 which store the codes for words 3 and 4 of a cycle respectively.

The completion of the designation of the three digit number by actuation of keyboard 12 can be used to cause an output over line 17 to a cycle start and control apparatus 18 for initiation of transmission. After the cycle has been thus initiated, a first word is transmitted for the purpose of identifying the purpose of the communication cycle. After the first word has been transmitted, a word scanner 19 is actuated to enable an output over line 20 to the word two code storage 14. Such energization enables an output of the storage 14 to be applied to a transmitter 21 which in turn applies the code of word 2 serially to the communication channel 10. The code output of the storage 14 that is enabled by energy on line 20 provides energization selectively of five bit wires in a manner to apply negative potential to each wire that corresponds to a mark character in the word 2 code storage. No energy is applied to bit wires that correspond to space code characters. Thus as the cycle progresses, the word scanner 19 applies enabling energy successively to wires 20, 22 and 23 to enable the outputs of word storages 14, 15 and 16 to be applied in turn to the transmitter 21 for transmission over the communication channel 10.

The word scanner 19 has a final stage during which the picking up of relay CS is rendered effective over wire 24. Energy is applied only momentarily to the wire 24 as the cycle start and control apparatus 18 restores the word scanner 19 to a normally inactive condition. Thus relay CS is picked up only momentarily because its stick circuit is open at this time. The picking up of relay CS closes a circuit at front contact 25 to momentarily energize lamp CSK to indicate to the operator that the cycle of operation for transmission has been completed and that the lamp CSK is operative so that it can be energized during an answerback cycle as will be hereinafter described. The word storages 14, 15 and 16 are retained at least until the end of the answerback cycle.

Upon reception at a field station of a plurality of words that have been transmitted by the transmitter 21 as has been described, field station communication apparatus 11 becomes operable in a manner well known to those skilled in the art to transmit an answerback code to the control office. Inasmuch as different types of communication cycles may be transmitted from the field stations to the control office, it can be assumed that the first word transmitted during an answerback cycle is a word to designate the mode of communication, namely that the cycle is for answerback purposes. Upon receiving this word by the receiver 26, a mode selector 27 is rendered active to designate the communication as being that of an answerback cycle, and in accordance therewith, energy is applied to wire 28 for the energization of the comparator relay CMP. Upon the picking up of this relay, it is maintained energized for the balance of the answerback cycle by cycle run energy coming from cycle start and control apparatus 18 through a diode 29 and front contact 30 to energize the lower winding of relay CMP.

Words 2, 3 and 4 which are received during the answerback cycle correspond to the words 2, 3 and 4 that have their codes stored in the storages 14, 15 and 16 respectively. The words are received successively, and each word code receives a two out of five check in two out of five check and execution apparatus 31. If the code of a word is valid as determined by the two out of five check, it is applied over line 32 to a single word temporary storage 33 for comparison bit for bit of mark characters in the code with the corresponding word that was transmitted and that is retained in a storage 14, 15 or 16. When a word is in the storage 33, this storage is conditioned to provide positive energization on each bit wire that corresponds to a mark of the code, and zero energization is applied to the bit wires corresponding to space characters. The output bit wires of the temporary storage 33 are applied to a comparator 34 through front contacts 35, 36, 37, 38 and 39 respectively of the comparator relay CMP. The closure of these contacts renders a comparison effective of the answerback code in the temporary storage with a code for the corresponding word as it was transmitted by the transmitter 21, when enabled by the word scanner 19.

Each positive energization of a bit wire in the temporary storage 33 corresponding to a mark character received, is inhibited by negative energy on a corresponding bit wire for the corresponding word in the storage 14, 15 or 16 that is enabled by the word scanner 19. If there is no inhibiting of the positive energy applied to a bit output wire of the temporary storage 33, an out of correspondence relay CR is momentarily picked up to reset the word scanner 19 and thus prevent the energization of the lamp CSK to indicate checking of correspondence between the transmitted code stored at the office and the answerback code received from the field during an answerback cycle. The picking up of relay CR under these conditions resets the word scanner 19 by the opening of back contact 40, and the closure of front contact 41 applies energy to the lamp CK to indicate an out of correspondence condition. When once reset during an answerback cycle, the word scanner 19 cannot be advanced to a position to cause the picking up of relay CS during that cycle to energize the correspondence lamp CSK. The word scanner is thus restored to zero, and its operation can be initiated again only upon the starting of a new communication cycle.

To consider more specifically a typical inhibit circuit, it will be assumed that the temporary storage 33 is storing the second word of the answerback cycle and that the first element of the word is a mark character and thus positive energization is applied to storage output wire 42. Assuming that the first bit of the word 2 that was transmitted was also a mark character, energy flows from a positive source of energy through wire 42, front contact 35 of relay CMP, resistor 43, diode 44, wire 45 and diode 46 to a negative source of energy in the storage 14. Current flowing in this circuit provides a voltage drop across resistor 43 that prevents the picking up of relay CR through diode 47. Should there by no negative source of energy in the word storage 14, no current flows in the inhibit circuit through the resistor 43, and thus sufficient potential is applied through diode 47 to pick up the relay CR and to reset the word scanner 19 as has been described. A similar check is made simultaneously on the output bit wire having the other mark character. There is no energy applied to a bit wire of any storage for space charatcers.

In order that the word scanner 19 may enable a storage 14, 15 or 16 corresponding to the word stored in the temporary storage 33, the word scanner 19 is controlled by the reception of an answerback cycle wherein it is advanced one step for each word output of the two out of five check and execution 31 through a delay circuit 48. The delay circuit 48 provides time for comparison of a word that has been advanced from the execution circuit 31 to the temporary storage 33, together with time for clearing the word out of the temporary storage 33 before advancing to the next step of the word scanner for conditioning it to compare the next word to be received by the temporary storage 33. After comparison has been made for the last word of the answerback cycle, the output of the delay circuit 48 advances the word scanner 19 to a step for application of energy to wire 24 for the picking up of the relay CS. As has been heretofore pointed out, the word scanner 19 cannot be advanced to its last step so as to apply energy to the wire 24 for the picking up of relay CS unless each bit wire energized with positive polarity by the temporary storage 33 during the answerback cycle has been inhibited by negative energization for a corresponding bit wire and word in each of the storages 14, 15 or 16. Once the relay CS has been picked up for providing a correspondence indication by the relay CSK at the end of an answerback cycle, it is maintained energized by a stick circuit until manually reset. This reset circuit includes contact 49 of push button PB, front contact 50 of relay CMP, front contact 51 of relay CS, and the lower winding of relay CS. The push button PB may also be used for other purposes, such, for example, as a start button for the next cycle of operation of the communication system. The relay CMP is maintained picked up by an auxiliary stick circuit including front contact 52 of relay CS. Thus the relay CMP is maintained picked up until the push button PB is actuated to reset the relay CS.

The steady illumination of the indicator lamp CSK manifests to an operator that the point designated has been selected. He will then push the reset button PB to extinguish the lamp CSK and proceed to transmit a desired control for the point that has been selected.

It is to be understood that the word scanner 19 could be operated during an answerback cycle by clock means in the cycle start and control apparatus 18 rather than by the time delay apparatus 48 as has been described. The stepping of the word scanner 19 under such conditions would enable the word storages 14, 15 and 16 for comparison with the answer back storage 33 at appropriate times during an answerback cycle as has been described.

Having thus described one specific embodiment for checking an answerback code for two-way code communication systems, it is desired to be understood that this form is selected to facilitate the disclosure of the invention rather than to limit the number of forms the invention can assume. Although the invention has been described in its preferred embodiment, it is to be understood that words which have been used are words of description rather than of limitation, and that changes within the purview of the appending claims can be made without departing from the true spirit and scope of the invention in its proper aspects.

What is claimed is:

1. A code communication system having transmitting and receiving apparatus at each of first and second stations for two-way code communication over a communication channel comprising, (a) control designating means for the first station for encoding in binary form each of a plurality of words for transmission during a cycle of operation of the communication system, the words always having the same total number of bits and the same number of bits of a particular character, (b) transmitted word code storage means for the first station having its input governed by the codes of the designating means for storing the bits of a plurality of multiple bit word codes, said word storage means having an output wire for each bit and means operable when rendered effective to energize said bit wire with one polarity when the corresponding bit stored in the associated storage is of said particular character, (c) code execution means for the first station for controlling delivery of word codes received over the communication channel in accordance with checking means for determining whether or not the code received for each word has said same number of bits of a particular character, (d) answerback word code storage means for the first station governed by the code execution means for storing bits of a word code that have been received at the first station and checked by the execution means, said answerback word code storage means having an output wire for each bit of the answerback word storage and means operable when rendered effective to energize said bit wire of the answerback storage with the opposite polarity when the bit stored in the associated storage is of said particular character, (e) word scanning means for the first station controlled at times by the control designating means and at other times by the receiving apparatus for rendering output on the bit wires of the transmitted word storage means effective one word at a time for the respective words to inhibit output over the bit wires of the answerback word storage, (f) checking means controlled by uninhibited output over the bit wires of the answerback word storage for sensing an out of correspondence condition of the transmitted and answerback storages, and (g) control means, governed by the checking means and effective after said word scanning means has scanned all of the words successively during a cycle of operation, for manifesting when each energized bit wire output of the answerback storage has been inhibited by energy on a corresponding bit wire of the transmitted word code storage during the cycle.

2. The invention according to claim 1 wherein the answerback storage stores only the code bits of one word at a time while the transmitted word code storage stores code bits for several words and the scanner sequentially compares the bit outputs of the several words of the transmitted word code storage, one word at a time, with the bit output of the answerback storage.

References Cited

UNITED STATES PATENTS

| | | | |
|---|---|---|---|
| 2,121,163 | 6/1938 | Robinson | 178—23 |
| 2,242,196 | 5/1941 | Thompson et al. | 340 146.1 X |
| 2,740,106 | 3/1956 | Phelps | 340—146.1 X |
| 3,110,013 | 11/1963 | Breese | 340—146.1 X |
| 3,228,000 | 1/1966 | Collis | 340—146.1 |

MALCOLM A. MORRISON, Primary Examiner

C. E. ATKINSON, Assistant Examiner

U.S. Cl. X.R.

178—23; 340—226